US009387450B2

(12) United States Patent
Ritter et al.

(10) Patent No.: US 9,387,450 B2
(45) Date of Patent: Jul. 12, 2016

(54) BACTERIORHODOPSIN-CONTAINING MICROCAPSULES AND METHOD FOR PRODUCING THE SAME

(75) Inventors: Ulrich Ritter, Nidda-Schwickartshausen (DE); Markus Lange, Bad Durrenberg (DE); Samuel Schindler, Oehringen (DE)

(73) Assignee: U-NICA Technology AG, Malans (CH)

( * ) Notice: Subject to any disclaimer, the term of this patent is extended or adjusted under 35 U.S.C. 154(b) by 411 days.

(21) Appl. No.: 13/266,207

(22) PCT Filed: Mar. 22, 2010

(86) PCT No.: PCT/EP2010/053673
§ 371 (c)(1),
(2), (4) Date: Oct. 25, 2011

(87) PCT Pub. No.: WO2010/124908
PCT Pub. Date: Nov. 4, 2010

(65) Prior Publication Data
US 2012/0055370 A1 Mar. 8, 2012

(30) Foreign Application Priority Data

Apr. 30, 2009 (CH) .......................................... 684/09

(51) Int. Cl.
| | |
|---|---|
| *B05D 5/06* | (2006.01) |
| *C09D 11/00* | (2014.01) |
| *A61K 38/16* | (2006.01) |
| *B01J 13/04* | (2006.01) |
| *B01J 13/18* | (2006.01) |

(52) U.S. Cl.
CPC ................ *B01J 13/04* (2013.01); *B01J 13/185* (2013.01); *B42D 2033/20* (2013.01); *B42D 2035/24* (2013.01)

(58) Field of Classification Search
CPC .......... B82Y 5/00; B82Y 30/00; A61K 38/00; C07K 14/195; C07K 14/215; B22F 1/0018; C07C 45/68; C07C 17/093; C07C 49/747; C07C 49/753; C07C 49/757; C07C 25/02; C07C 25/18; C07C 205/11; C07C 205/12; C07C 2101/04; C07C 2103/46; C07C 215/68; C07C 219/32; C07C 229/30; C07C 233/66; C07C 233/69
USPC ............... 427/162, 331, 389.9, 212, 427/213.3–213.36, 483, 256; 264/534, 5, 264/41, 4–4.7; 424/400, 408, 450, 451, 424/455, 93.7, 184.1, 497, 489, 501, 490, 424/491, 4, 92, 493, 494, 495
See application file for complete search history.

(56) References Cited

U.S. PATENT DOCUMENTS

| | | | |
|---|---|---|---|
| 3,432,327 A | | 3/1969 | Kan et al. |
| 4,965,174 A | * | 10/1990 | Arai et al. ..................... 430/340 |
| 5,681,584 A | * | 10/1997 | Savastano et al. ............ 424/473 |
| 5,807,625 A | | 9/1998 | Amon et al. |
| 6,274,279 B1 | | 8/2001 | Hampp et al. |
| 6,616,964 B1 | | 9/2003 | Hampp et al. |
| 7,175,950 B2 | | 2/2007 | Anderson et al. |
| 2002/0155152 A1 | * | 10/2002 | Nomoto et al. ............... 424/450 |
| 2007/0042184 A1 | * | 2/2007 | Coyne et al. ............... 428/402.2 |
| 2010/0173002 A1 | * | 7/2010 | Yulai et al. .................... 424/492 |

FOREIGN PATENT DOCUMENTS

| | | |
|---|---|---|
| CN | 101130682 A | 2/2008 |
| DE | 199 14 702 A1 | 10/2000 |
| GB | 2 196 143 A | 4/1988 |

OTHER PUBLICATIONS

Wu et al. "Bacteriorhodopsin encapsulated in transparent sol-gel glass: a new biomaterial" Chem. Mater. 1993, 5, 115-120.*
Andreas Schonafinger et al., "Bioinspired Nanoencapsulation of Purple Membranes," The Royal Society of Chemistry, Soft Matter; 2008, pp. 1249-1254, vol. 4.
Office Action issued in corresponding Eurasian Patent Application No. 20117129428 dated May 29, 2013.
Office Action issued in corresponding Chinese Patent Application No. 2010800193339 dated Aug. 26, 2013.

* cited by examiner

*Primary Examiner* — Bijan Ahvazi
*Assistant Examiner* — S. Camilla Pourbohloul
(74) *Attorney, Agent, or Firm* — Sughrue Mion, PLLC

(57) ABSTRACT

A method for producing bacteriorhodopsin-containing microcapsules is described, which can be optically activated, having a diameter of less than 50 μm, preferably less than 10 μm, comprising an enveloping layer, which protects the bacteriorhodopsin from harmful environmental factors, while at the same time preserving the functionality thereof. In doing so, bacteriorhodopsin is suspended in a first step, in the form of PM/BR patches in an aqueous medium having a pH value ranging from 6-9 in the presence of a water-retaining polymer, and said suspension is spray-dried to form a powder, or is dried in an aliphatic solvent using low steam pressure and subsequent dehydration to form a powder. In a second step, the powder obtained in this way is provided with an envelope, which is substantially completely translucent to light in the visible range and made of a polymer and/or a paraffin having a solidification point ranging between 45° C. and 65° C. and/or a carnauba wax having a melting range of 70-90° C. Furthermore, such microcapsules are described, and uses of such microcapsules.

37 Claims, No Drawings

US 9,387,450 B2

BACTERIORHODOPSIN-CONTAINING MICROCAPSULES AND METHOD FOR PRODUCING THE SAME

CROSS REFERENCE TO RELATED APPLICATIONS

This application is a National Stage of International Application No. PCT/EP2010/053673 filed Mar. 22, 2010, claiming priority based on Swiss Patent Application No. 00684/09 filed Apr. 30, 2009, the contents of all of which are incorporated herein by reference in their entirety.

TECHNICAL FIELD

The present invention relates to the field of methods for producing bacteriorhodopsin pigments and to pigments based thereon and uses of such pigments.

PRIOR ART

Bacteriorhodopsin, and especially bacteriorhodopsin in its customarily existing form as two-dimensional crystalline patches as purple membrane, is an intensively studied system. The system is of great interest, in particular, because it is able as an extremely resistant optical system to adopt different optical states which have half lives of interest. Thus, for example, in particular in the mutant D96N there is a transition from the light-adapted (mustard-yellow) state to the dark state (violet) with a half life of about 20 s. This half life is affected by various factors of the environment, in particular by the pH existing in the environment.

It is a problem with this system, inter alia, that bacteriorhodopsin in purple membrane can be easily denatured by environmental influences, in particular when it comes into contact with certain organic solvents or surfactants.

A recent publication (cf. Soft Matter, 2008, 4, 1249-1254) discloses a method in which bacteriorhodopsin in the purple membrane is coated on the charged surfaces with a thin layer of water glass in a biomimetic process. For this purpose, in a first step a polyelectrolyte (polyethyleneimine) is first adsorbed solely on the charged surface, that is to say not all-round, and then, in a second step, a water glass layer is built up on this polyelectrolyte with the aid of TEOS. The resultant systems correspondingly comprise a layer of water glass which is not completely enveloping but is substantially only on the charged surface. This layer protects the bacteriorhodopsin in the purple membrane from the harmful effect of organic solvents, but the water glass is not completely impermeable. It is permeable, in particular, to small ions, in particular protons and hydroxide ions. Larger ions and large particles are substantially excluded. The biomimetic nanoencapsulation therefore does not completely isolate the PM/BR from the environment. The bacteriorhodopsin therefore continues to react to changes in the pH of the environment. Correspondingly, such systems can only be used in situations where the pH of the environment can also be kept within a range where the desired optical properties of the bacteriorhodopsin are present.

DESCRIPTION OF THE INVENTION

It is therefore one of the objects of the present invention to provide an improved method for producing bacteriorhodopsin/purple membrane fragments or bacteriorhodopsin/purple membrane patches, which method does not have the disadvantages of the abovementioned prior art.

Accordingly, the present invention relates, inter alia, to a method for producing optically activatable bacteriorhodopsin-containing microcapsules having a diameter of less than 50 µm, preferably less than 20 µm, or further preferably less than 10 µm, having an enveloping layer which protects the bacteriorhodopsin from harmful environmental effects while simultaneously retaining functionality thereof. In this case the coating layer protects not only from organic solvents and surfactants, but also to a certain extent from the pH of the environment. In other words, in the microcapsule there is a defined pH which is not substantially affected by the pH of the environment of the microcapsule. Thus it can be ensured that, independently of the pH of the environment, the microcapsules or the bacteriorhodopsin/purple membrane system enclosed therein has the desired optical properties. The microcapsules can also be termed pigments.

The method in this case is characterized in particular in that, in a first step, bacteriorhodopsin is suspended in the form of bacteriorhodopsin/purple membrane patches in an aqueous medium at a pH in the range of 6-9 in the presence of a water-retaining polymer and this suspension is spray dried to form a powder or is dried in an aliphatic solvent with low vapor pressure and subsequent water removal to form a powder. In this first step, a precursor capsule is effectively generated, in which precursor capsule the bacteriorhodopsin/purple membrane is fixed in a pH range suitable for the optical activity thereof. This precursor capsule, however, typically does not yet have a sufficiently stable outer skin, the outer skin can still be dissolved in water. The precursor capsule, also termed activatable powder, because this powder already has stabilized optical properties of bacteriorhodopsin, can, however, already be dried and be stored in a stable manner for a relatively long time.

Accordingly, in a second step the resultant powder is preferably provided with a sheath that is substantially completely permeable to light in the visible range and is made of a polymer (or a precursor thereof, polymer or precursor preferably in dispersion in the process) and/or a long-chain saturated (preferably unbranched) hydrocarbon and/or a long-chain saturated (preferably unbranched) fatty acid (including fatty acid derivatives). In the context of long-chain saturated hydrocarbons or fatty acids, long-chain here means that (in the case of a mixture on average) at least 15, preferably at least 18, particularly preferably at least 25, carbon atoms are present. Also coming into consideration, for example, as long-chain saturated hydrocarbon, are mixtures such as, for example, paraffin, preferably having a solidification point in the range of 45° C.-65° C., and, as long-chain saturated fatty acid, for example, esters of aliphatic unbranched C20 to C30 acids with C30 to C34 alcohols (these likewise aliphatic and unbranched) such as, for example, a carnauba wax (myricyl cerotate, carnaubic acid, cerotic acid and hydrocarbons in a mixture), preferably having a melting range of 70-90° C.

Accordingly, the following aims can be achieved individually and/or in combination:

- transparency of the wall material to visible light/very low inherent color
- decoupling the compartment in the capsule from the environment around the capsule
- control of the conditions in the capsule: content of bacteriorhodopsin (BR); pH; water content, salt content
- particle fineness less than 50 µm, or less than 20 micrometers, preferably less than 10 µm
- resistance of the capsules to 10% strength ethanolic solution over 24 h at 25° C.
- retention of the color change functionality on storage in 10% strength ethanolic solution the method can be employed both with natural bacteriorhodopsin and also with mutants, in particular with mutant D96N.

The color change pigment bacteriorhodopsin can only fulfill its function when it is embedded in bacteriogenic purple membrane. This embedding is destroyed by harmful chemicals such as surfactants, polar solvents or other components, such as are typical of printing inks.

In addition, the color change functionality is only ensured when the proton availability is known and constant. For this purpose both pH and the water content must be adjusted and kept constant.

In order firstly to keep remote the harmful effects from the outside and secondly to retain the suitable composition in the interior, the proposed encapsulation is performed.

Conventional microencapsulation methods, such as are prior art for flavors or pharmaceutically active ingredients, cannot be employed for the present problem. During the encapsulation of flavors, bathing additives or other similarly lipophilic substances, the encapsulation succeeds via utilization of the lipophilicity and an emulsion polymerization. An aqueous suspension as in the present case is not lipophilic, and a w/w emulsion thus will not succeed.

Pharmaceutically active ingredients are sheathed with materials which either dissolve under predetermined physiological conditions (e.g. passage through the stomach, dissolution in the intestine) or else the materials are permeable in order to enable controlled release of active ingredient. Neither dissolution nor passage of substances can be accepted in the present case.

Methods as are used for producing self-copying papers (e.g. U.S. Pat. No. 3,432,327 (1969)) are unsuitable, since they are directed towards hard spheres which must burst under mechanical stress in a targeted manner. Bursting of the capsules can also not be tolerated.

Therefore, only methods for encapsulation are possible which effectively freeze or encapsulate exactly the environmental conditions necessary for the color-change functionality for the system bacteriorhodopsin/purple membrane.

Color change protein encapsulated according to the invention is in a structure as follows:

In a spherical shell (outer diameter less than 50 μm, preferably less than 20 or 10 μm) of suitable wall thickness, consisting of a preferably crosslinked polymer such as polyacrylate or a sufficiently long-chain polymer such as paraffin there is situated a core made of a water-retaining polymer such as gelatin, polyethylene glycol, acrylic acid-sodium acrylate copolymer, polyvinylpyrrolidone, polyvinyl alcohol or suitable polysaccharides such as gum arabic, derivatized cellulose, glycogen, starch or derivatized chitin, in addition xanthan, sugar alcohols, pectins, guar, carob bean meal or carrageenan, superabsorbers or other sufficiently water-retaining polymers.

Into this (these) water-retaining polymer(s), the color change protein is embedded at a concentration typically not less than 20% by weight at a suitable pH (6-9).

The embedding is achieved preferably by spray drying a solution which contains not only the color-change protein, and a suitable buffer system, but also the water-retaining polymer or polymers at a concentration of less than 3% by weight.

Alternatively, the embedding can also proceed by suspending an aqueous solution of the color-change protein, buffer system and water-retaining polymer in an aliphatic solvent of low vapor pressure and subsequent water removal by suitable molecular sieves such as zeolites.

A further alternative is embedding by means of coacervation by gelatin/gum arabic.

Color-change protein encapsulated in such a manner is sealed from the outside by a preferably crosslinkable plastic or by a paraffin layer or another layer made of a material such as described above. An important criterion for selecting a suitable envelope material can be that the plastic, the fatty acid (or the fatty acid derivative) or the hydrocarbon, at the temperatures important for the desired pigment system, is sufficiently above its glass transition point Tg. Provided that, in addition, the Tg is not above the temperature at which the BR denatures, and provided that the merging of the polymer droplets is not inhibited by inherent properties of the system.

The inclusion proceeds after formation of the core by
suspension of the spray-dried core material in a suitable precursor of the crosslinkable plastics such as light-curable or thermally curable acrylates
suspension of the spray-dried core material in a melt of a paraffin having a melting point not above 75° C.
spraying the spray-dried core material into an atomized spray of the preferably crosslinkable precursor
spraying the spray-dried core material into an atomized spray of a paraffin having a melting point not above 75° C.
coacervation of the core material with gelatin/gum arabic Color-change protein included according to the invention exhibits unrestricted color change functionality even after storage over 14 days in 10% strength ethanolic solution at 25° C.

A first preferred embodiment of the method is correspondingly characterized in that in the first step, the pH is set using a buffer system in the range 7.5-9, preferably in the range 8-8.5.

Generally, preferably the buffer system used is a system selected from the following group: phosphate buffer, TRIS/HCl (TRIS stands for tris(hydroxymethyl)aminomethane), ammonia buffer, carbonic acid/hydrogencarbonate systems, diglycine (corresponds to glycylglycine or glycylglycine), bicine (corresponds to N,N-bis(2-hydroxyethyl)glycine), HEPPS (abbreviation of: 4-(2-hydroxyethyl)piperazine-1-propanesulfonic acid), HEPES (abbreviation of: 2-(4-(2-hydroxyethyl)-1-piperazinyl)ethanesulfonic acid), HEPBS (abbreviation of: N-(2-hydroxyethyl)piperazine-N'-(4-butanesulfonic acid)), TAPS (abbreviation of: N-[tris(hydroxymethyl)methyl]-3-aminopropanesulfonic acid or [(2-hydroxy-1,1-bis(hydroxymethyl)ethyl)amino]-1-propanesulfonic acid, AMPD (or ammediol; abbreviation of: 2-amino-2-methyl-1,3-propanediol)) or a combination thereof.

With respect to the buffer, preferably care is taken that its total concentration is not too high, since otherwise the optical properties can be limited. Correspondingly, the buffer is preferably at a concentration of less than 0.03M, particularly preferably at a concentration of less than 0.02M. As already discussed, firstly the pH in the environment of the bacteriorhodopsin is important, but secondly also the water content. According to a further preferred embodiment, the water content in the environment of bacteriorhodopsin is controlled in a targeted manner. This can be achieved, preferably, by adding in the first step, in the suspension, at least one moisture-retention agent as auxiliary.

This moisture-retention agent can be suitable potassium salts or a sugar-based moisture-retention agent or sugar-alcohol-based moisture-retention agent. Particularly preferably, it is a mixture of potassium salts such as, e.g., potash, with a sugar-alcohol-based moisture-retention agent, since such systems do not have a strong tendency to crystallization and do not impair the optical properties. Particularly preferably, it is a mixture of potash with xylitol and/or sorbitol, particularly preferably in the ratio 1:2-2:1 (for example approximately in the ratio 1:1).

A further preferred embodiment is characterized in that, in the first step, the total fraction of bacteriorhodopsin/purple membrane, buffer and auxiliary in the suspension makes up less than 3 percent by weight.

As already explained above, preferably, bacteriorhodopsin in the form of PM/BR patches in the water-retaining polymer is present in a fraction of at least 20 percent by weight.

Generally, the water-retaining polymer is preferably a system selected from the following group: gelatin, polyethylene glycol, acrylic acid-sodium acrylate copolymer, polyvinylpyrrolidone, polyvinyl alcohol, polysaccharides, sugar alcohols, gum arabic, derivatized cellulose, glycogen, starch, derivatized chitin, xanthan, pectins, guar, carob bean meal, carrageenan, superabsorbers, zeolites and combinations or mixtures of such water-retaining polymers. Other water-retaining polymers are also possible, provided that they do not exhibit any adverse chemical and/or optical interaction with the bacteriorhodopsin/purple membrane system.

A further preferred embodiment is characterized in that the polymer of the sheath is selected from the following group: polystyrene, polyacrylate, styrene-acrylate copolymer, polyurethane, polyvinyl alcohol, polyvinyl butyral, modified starch, modified cellulose, or copolymers, mixtures and/or crosslinked or crosslinkable forms thereof. The polymers can be, for example, polymers that are crosslinkable under the action of light and/or heat, or catalytically crosslinkable polymers.

A further preferred embodiment is distinguished in that, in the second step, the sheath is generated with the aid of a spray encapsulation, preferably by means of a 3-component nozzle or by means of spray solidification, or with the aid of a suspension polymerization.

In addition, the present invention relates to a microcapsule containing optically activatable bacteriorhodopsin, the microcapsule having a diameter of less than 10 μm, and having an envelope layer which protects the bacteriorhodopsin from harmful environmental effects while simultaneously retaining functionality thereof. In this case the bacteriorhodopsin is embedded in the form of PM/BR patches in an aqueous medium at a pH in the range of 6-9 in the presence of a water-retaining polymer, and this inner capsule is provided with a sheath that is substantially completely permeable to light in the visible range and is made of a polymer and/or a long-chain saturated hydrocarbon and/or a long-chain saturated fatty acid, preferably a paraffin having a solidification point in the range of 45° C.-65° C. and/or a carnauba wax having a melting range of 70-90° C.

Such a microcapsule is preferably produced or producible by a method as has been described above.

Preferably, such a method is characterized in that the bacteriorhodopsin in the capsule is present at a pH in the range of 8-8.5 and is substantially completely unaffected by the pH present outside the sheath.

The bacteriorhodopsin is preferably present in the capsule in a buffer system preferably selected from the following group: phosphate buffer, TRIS/HCl, ammonia buffer, carbonic acid/hydrogencarbonate, HEPES, HEPES, AMPD, preferably at a concentration of less than 0.03M, particularly preferably at a concentration of less than 0.02M.

The bacteriorhodopsin is situated in the capsule in the presence of a moisture-retention agent (optionally in combination with further auxiliaries such as, for example, biocides or the like), wherein it is preferably a mixture of a potassium salt such as, e.g., potash with a sugar-based (also sugar alcohol-based; see further above) moisture retention agent, in particular preferably a mixture of potash with xylitol and/or sorbitol, very particularly preferably in the ratio 1:2-2:1.

A further preferred embodiment of the microcapsule is characterized in that the bacteriorhodopsin in the form of PM/BR patches in the water-retaining polymer is present in a fraction of at least 20 percent by weight, wherein the water-retaining polymer is preferably a system selected from the following group: gelatin, polyethylene glycol, acrylic acid-sodium acrylate copolymer, polyvinylpyrrolidone, polyvinyl alcohol, polysaccharides, gum arabic, derivatized cellulose, glycogen, starch, derivatized chitin, xanthan, sugar alcohols, pectins, guar, carob bean meal, carrageenan, superabsorbers, zeolites and combinations or mixtures of such water-retaining polymers.

The polymer of the sheath can in turn be selected from the following group: polystyrene, polyacrylate, styrene-acrylate copolymer, polyurethane, polyvinyl alcohol, polyvinyl butyral, modified starch, modified cellulose, or copolymers, mixtures and/or crosslinked or crosslinkable forms thereof.

In addition, the present invention relates to the use of such microcapsules as pigment for a paint, for a coating, for a coating formulation, for a filler, for an adhesive layer, for a hologram, for an inkjet ink, for an offset ink, for a gravure ink, for printed circuit boards, in particular preferably as pigment for a security ink.

Possible applications are, correspondingly, multi-layer structures having such microcapsules, adhesives or sizes containing such microcapsules, hot-melt adhesives and also cold-cure adhesives, coatings for paper, plastic and other substrates, for example as coating formulations together with pigments and binders, lacquers, as fillers, as pouring agents, as component of a wet-strength agent, for capsules, pills, powders, tablets, suppositories, for biometric applications such as, for example, passes, identification documents and security documents, security films, labels, sealing films, transfer films, vouchers, cards, safety threads, overlays, safety fibers, holograms, bank note component, photographs, packages and packaging components, data storage applications.

In addition, the present invention relates to a security ink having such microcapsules. Such a security ink can be used, for example, in screenprinting, in inkjet methods, in gravure printing methods, in lithographic printing methods (e.g. offset printing), in high pressure methods (e.g. flexography), in spraying methods, in dispensers or in the offset method.

Such a safety ink can be cured in various drying methods: conventionally by solvent evaporation, by UV drying (free-radical or cationic), by chemical reaction, by heat-set, by IR drying or by combinations of these methods.

Further exemplary embodiments are described in the dependent claims.

DESCRIPTION OF PREFERRED EMBODIMENTS

With the aid of a detailed description of the exemplary embodiments, the invention, that is to say the microencapsulation of PM/BR with simultaneous retention of functionality, is explained hereinafter. The following explanations should not be used to restrict the subject matter of the invention as worded hereinabove in general form and also in the patent claims.

Production of the Activatable Powder:

The activatable powder is produced starting from a spray solution with the aid of a spray dryer:

Production of the Spray Solution:

In a first step a buffer is produced by dissolving 60 g of $KH_2PO_4$ (solid) in 500 g of deionized water with stirring. The pH is then adjusted to pH 8.3 with stirring at room temperature by adding KOH (10% by weight in deionized water) dropwise.

The actual spray solution is made up as follows:

Weigh out and dissolve with stirring in a water bath (approximately 60° C.): 60 g of gum arabic (FLUKA) [EG #2325 195]; 30 g of maltodextrin (VWR) [CAS #9050-36-6]; 25 g of phosphate buffer (produced as stated above); 0.2 g of Mergal D9N (Troy); 900 g of deionized water. Allow to cool to RT with stirring. Weigh out and dissolve with stirring at RT: 1000 g of aqueous suspension PM/BR (approximately 8% solids, ACTILOR); 2 g of potash (Roth) [CAS #584-08-7]; 2 g of xylitol (VWR) [CAS #87-99-0]. Readjust pH to pH=8.3 (±0.2) at room temperature.

Spraying the "Activatable Powder":

Spray conditions: B-290 laboratory spray dryer (BÜCHI), 2-component nozzle; inlet temperature of the intake air: 140° C.; outlet temperature (downstream of spray cylinder): 79° C. (±2° C.); aspirator power: 95%; transport power peristaltic pump: 25%-30% (ISMATEC peristaltic pump, twin-head pump, criterion: optimum spray pattern); spray air rotameter: 55 SKT.

Under the above-described spray conditions, around 0.5 liter of PM/BR suspension was sprayed per hour. A violet powder is obtained which, on illumination with white light (sunlight, halogen lamp or white light LED), reversibly changes to beige. The color change is reversed back to violet after approximately 20 seconds without illumination.

The product thus obtained is termed "activatable powder" hereinafter. It already consists of capsules, but the capsule walls are not yet completely inert. They can redissolve in pure water.

The activatable powder can be stored for months at room temperature without exhibiting signs of degradation.

The activatable powder can be processed to form encapsulated particles within the meaning of the invention with the aid of various methods. Three possible methods will be presented hereinafter, firstly spray encapsulation by means of a 3-component nozzle (A), spray encapsulation by means of spray solidification (B), and suspension polymerization (C).

A: Spray Encapsulation by Means of a 3-Component Nozzle

Suspension: The starting material for the suspension is the activatable powder produced as described above. It is slurried to form a suspension in the following method: To 100 g of deionized water there are added 2.7 g of $K_3PO_4.3H_2O$ (solid, Roth) [CAS #7778-53-2]) and dissolved with stirring, then at room temperature the pH is adjusted to 8.3 using KOH(aq). Then, 4 g of maltodextrin 4.0 g (VWR, [CAS #9050-36-6]) are added and the mixture is stirred until a clear solution is obtained. Then, 4 g of activatable powder are added just shortly before the actual spraying of the solution and suspended. The solution is further stirred slowly during the spraying.

Dispersion for sheath: starting material for the sheath is a styrene-acrylate copolymer as dispersion in water. Specifically in this case the Joncryl 77 system is used (Johnson polymer; solids content: 46.2%). In this case 4 g of Joncryl 77 are introduced into 80 g of deionized water and stirred.

The acrylate dispersion Joncryl 77 can also be replaced by other adhesive dispersions (acrylate, polyurethane, polyvinyl alcohol, polyvinyl butyral, modified starch, modified cellulose, etc.). It is important in this case that the pH of the sheating dispersion is in the slightly alkaline range, in order to provide compatibility with the PM/BR system and the film that forms is sufficiently stable to denaturing molecules such as ethanol, isopropyl alcohol methanol, acetone or surfactants.

Spray conditions for the spray encapsulation: In a B-290 laboratory spray dryer (BÜCHI) with inserted 3-component nozzle, the work is carried out at an inlet temperature of the intake of approximately 140° C. and at an outlet temperature (downstream of spray cylinder) of approximately 60° C. (±2° C.). The aspirator output is set to approximately 95%, the transport output of the ISMATEC peristaltic pump used is set to 8.0. Rotameter spray air: 50 SKT.

A violet powder is obtained which, on illumination with white light (sunlight, halogen or LED) exhibits the BR-typical color change.

This optical behavior of the powder obtained is retained in the long term, even if the powder is slurried in aqueous solution, stored at a pH in the acidic range (below pH 7) or in a strongly basic range (above pH=9). That is to say the local environment in the capsule at pH 8.3, in which the PM/BR system is stored, is not affected by the acidic or strongly basic environment outside the sheath. The optical system is therefore encapsulated from harmful environmental effects while simultaneously retaining functionality. In addition, it is also actually found that the addition of substances that per se denature the PM/BR system, such as, for example, ethanol, isopropyl alcohol, methanol, acetone or surfactants, cannot impair the thus encapsulated systems in their optical function.

B: Spray Encapsulation by Means of Spray Solidification:

The B-290 laboratory spray dryer (BÜCHI) also permits spray solidification. For this purpose the apparatus is modified. During the spray solidification, only operation with a 2-component nozzle is possible.

For the spray solidification, activatable powder as described above is used:

Suspension: Starting material for the suspension is the activatable powder produced as described above. It is slurried to form a suspension in the following method: To 100 g of deionized water are added 2.7 g of $K_3PO_4.3H_2O$ (solid, $K_3PO_4.3H_2O$ (Roth) [CAS #7778-53-2]) and dissolved with stirring, then the pH is set to 8.3 at room temperature using KOH(aq). Then, 4 g of maltodextrin 4.0 g (VWR, [CAS #9050-36-6]) are added and the mixture is stirred until a clear solution is obtained. Then, 4 g of activatable powder are added just shortly before the actual spraying of the solution and suspended. The solution is slowly stirred further during the spraying.

Double emulsion: The resultant suspension (approximately 50% strength of activatable powder) is suspended in molten paraffin (melting range 60° C. to 65° C.), or alternatively in molten carnauba wax (melting range 80° C. to 87° C.) with stirring.

Spraying conditions for the spray solidification: In a B-290 laboratory spray dryer (BÜCHI), the work is carried out at an inlet temperature (intake air) of room temperature and an outlet temperature (downstream of spray cylinder) likewise of room temperature. The aspirator output is set to 95%.

Here also a violet powder is obtained which, on illumination with white light (sunlight, halogen or LED) exhibits the BR-typical color change.

This optical behavior of the resultant powder is again retained in the long term, even when the powder is slurried in aqueous solution, stored at a pH in the acidic range (below pH 7) or in a strongly basic range (above pH=9). That is to say the local environment, in the capsule at pH 8.3 in which the PM/BR system is stored, is not affected by the acidic or strongly basic environment outside the sheath. The addition of substances that inherently denature the unprotected PM/BR system such as, for example, ethanol, isopropyl alcohol, methanol, acetone or surfactants, also cannot impair the thus encapsulated systems in their optical function. The optical system is therefore, in this exemplary embodiment as well, encapsulated from harmful environmental effects while simultaneously retaining functionality.

C: Suspension Polymerization

A suspension of activatable powder in aqueous solution is produced as follows:

Starting material for the suspension is the activatable powder produced as described above. It is slurried to form a suspension in the following method: To 100 g of deionized water are added 2.7 g of $K_3PO_4.3H_2O$ (solid, $K_3PO_4.3H_2O$ (Roth) [CAS #7778-53-2]) and dissolved with stirring, then at room temperature, the pH is set to 8.3 using KOH(aq). Then, 4 g of maltodextrin 4.0 g (VWR, [CAS #9050-36-6]) are added and the mixture is stirred until a clear solution is obtained. Then, 4 g of activatable powder are added just shortly before the actual initiation of the polymerization and suspended. The suspension thus produced is suspended in a dry aliphatic solvent (cyclohexane or petroleum ether). If necessary, a surfactant is added for adaptation of the surface tension. The solvent is dried by pouring in molecular sieve beads or by forcing in sodium wire. The work should proceed under sharply dried air or under dry nitrogen.

To this double emulsion, cyanomethacrylate or cyanoacrylate (obtainable, e.g., under the name Hernon Quantum from Ellsworth Adhesives, US) is added dropwise with stirring. The stirrer speed is selected in such a manner that the size of the suspended particles is less than 10 μm. Around the suspended particles of activatable powder with sheaths of polycyanomethacrylate or polycyanoacrylate form.

Here also a violet powder is obtained which, on illumination with white light (sunlight, halogen or LED) exhibits the BR-typical color change.

This optical behavior of the resultant powder is again retained in the long term, even when the powder is slurried in aqueous solution, stored at a pH in the acidic range (below pH 7) or in a strongly basic range (above pH=9). That is to say the local environment in the capsule at pH 8.3, in which the PM/BR system is stored, is not affected by the acidic or strongly basic environment outside the sheath. The addition of substances that inherently denature the unprotected PM/BR system such as, for example, ethanol, isopropyl alcohol, methanol, acetone or surfactants, also cannot impair the thus encapsulated systems in their optical function. The optical system is therefore, even in this exemplary embodiment, encapsulated from harmful environmental effects while simultaneously retaining functionality.

The invention claimed is:

1. A method for producing optically activatable bacteriorhodopsin-containing microcapsules, the method comprising:
   in a first step, suspending bacteriorhodopsin in the form of bacteriorhodopsin/purple membrane patches in an aqueous medium at a pH in the range of 6-9 in the presence of a water-retaining polymer to form a suspension, and spray-drying said suspension to form inner capsules in the form of a powder or drying said suspension in an aliphatic solvent with low vapor pressure and subsequent water removal to form inner capsules in the form of a powder;
   in a second step, providing the resultant inner capsules with a sheath that is permeable to light in the visible range and is made of at least one of a polymer, a long-chain saturated hydrocarbon and a long-chain saturated fatty acid, so as to obtain microcapsules having a diameter of less than 50 μm, the sheath forming an enveloping layer protecting the bacteriorhodopsin from harmful environmental effects while simultaneously retaining functionality thereof, so that the bacteriorhodopsin in the inner capsules is unaffected by a pH present outside the sheath; and
   placing the microcapsules in a powder or an aqueous slurry, wherein the bacteriorhodopsin/purple membrane patches have a two-dimensional crystalline structure.

2. The method as claimed in claim 1, wherein the microcapsules have a diameter of less than 10 μm.

3. The method as claimed in claim 1, wherein, in the first step, the pH is set using a buffer system in the range 7.5-9.

4. The method as claimed in claim 3, wherein the pH is set in the range of 8-8.5.

5. The method as claimed in claim 3, wherein the buffer system is selected from the following group: phosphate buffer, TRIS/HCl, ammonia buffer, carbonic acid/hydrogencarbonate system, diglycine, bicine, HEPPS, HEPES, HEPBS, TAPS, AMPD, and combinations thereof.

6. The method as claimed in claim 3, wherein the buffer system has a concentration of less than 0.03M.

7. The method as claimed in claim 1, wherein, in the first step, at least one moisture-retaining auxiliary is present in the suspension.

8. The method as claimed in claim 7, wherein the moisture-retaining auxiliary is a mixture of a potassium salt with a sugar- or sugar-alcohol-based moisture retention agent.

9. The method as claimed in claim 7, wherein the potassium salt is potash.

10. The method as claimed in claim 7, wherein the moisture-retaining auxiliary is a mixture of potash with at least one of xylitol and sorbitol.

11. The method as claimed in claim 10, wherein the mixture is in a ratio of 1:2 to 2:1.

12. The method as claimed in claim 1, wherein, in the first step, said bacteriorhodopsin/purple membrane patches, said buffer and any auxiliary in the suspension together make up a fraction of less than 3 percent by weight.

13. The method as claimed in claim 1, wherein bacteriorhodopsin in the form of bacteriorhodopsin/purple membrane patches is present in the water-retaining polymer in a fraction of at least 20 percent by weight.

14. The method as claimed in claim 1, wherein the water-retaining polymer is selected from the following group: gelatin, polyethylene glycol, acrylic acid-sodium acrylate copolymer, polyvinylpyrrolidone, polyvinyl alcohol, polysaccharides, gum arabic, derivatized cellulose, glycogen, starch, derivatized chitin, xanthan, sugar alcohols, pectins, guar, carob bean meal, carrageenan, superabsorbers, zeolites and combinations or mixtures thereof.

15. The method as claimed in claim 1, wherein the sheath comprises a polymer selected from the following group: polystyrene, polyacrylate, styrene-acrylate copolymer, polyurethane, polyvinyl alcohol, polyvinyl butyral, modified starch, modified cellulose, and copolymers, mixtures and crosslinked or crosslinkable forms thereof.

16. The method as claimed in claim 1, wherein the second step comprises generating the sheath with the aid of spray encapsulation or with the aid of a suspension polymerization.

17. The method of claim 16, wherein spray encapsulation is carried out by means of a 3-component nozzle or by means of spray solidification.

18. The method as claimed in claim 1, wherein the bacteriorhodopsin/purple membrane patches are bacteriogenic.

19. Optically activatable bacteriorhodopsin-containing microcapsules in a form of a powder or an aqueous slurry, the microcapsules comprising:

an inner capsule comprising bacteriorhodopsin in the form of bacteriorhodopsin/purple membrane patches embedded in an aqueous medium at a pH in the range of 6-9 in the presence of a water-retaining polymer; and a sheath that is permeable to light in the visible range and is made of at least one of a polymer, a long-chain saturated hydrocarbon and a long-chain saturated fatty acid, the sheath forming an envelope layer which protects the bacteriorhodopsin from harmful environmental effects while simultaneously retaining functionality thereof, so that the bacteriorhodopsin in the inner capsule is unaffected by a pH present outside the sheath, wherein the microcapsules have a diameter of less than 50 µm, and wherein the bacteriorhodopsin/purple membrane patches have a two-dimensional crystalline structure.

20. The microcapsules as claimed in claim 19, wherein the sheath comprises at least one of: a paraffin having a solidification point in the range of 45° C.-65° C., and a carnauba wax having a melting range of 70-90° C.

21. The microcapsules as claimed in claim 19, having a diameter of less than 10 µm.

22. The microcapsules as claimed in claim 19, wherein the bacteriorhodopsin in the microcapsules are present at a pH in the range of 8-8.5.

23. The microcapsules as claimed in claim 19, wherein the bacteriorhodopsin in the microcapsules are present in a buffer system selected from the following group: phosphate buffer, TRIS/HCl, ammonia buffer, carbonic acid/hydrogencarbonate system, diglycine, bicine, HEPPS, HEPES, HEPBS, TAPS, AMPD, and combinations thereof.

24. The microcapsules as claimed in claim 23, wherein the buffer system is present in a concentration of less than 0.03M.

25. The microcapsules as claimed in claim 19, wherein the bacteriorhodopsin in the inner capsule comprises a moisture-retaining auxiliary.

26. The microcapsules as claimed in claim 25, wherein the moisture-retaining auxiliary is a mixture of a potassium salt with a sugar- or sugar-alcohol-based moisture-retention agent.

27. The microcapsules as claimed in claim 26, wherein the potassium salt is potash.

28. The microcapsules as claimed in claim 26, wherein the moisture-retaining auxiliary is a mixture of potash with at least one of xylitol and sorbitol.

29. The microcapsules as claimed in claim 28, wherein the mixture is present in a ratio of 1:2 to 2:1.

30. The microcapsules as claimed in claim 19, wherein bacteriorhodopsin in the form of bacteriorhodopsin/purple membrane patches is present in the water-retaining polymer in a fraction of at least 20 percent by weight.

31. The microcapsules as claimed in claim 19, wherein the water-retaining polymer is selected from the following group: gelatin, polyethylene glycol, acrylic acid-sodium acrylate copolymer, polyvinylpyrrolidone, polyvinyl alcohol, polysaccharides, gum arabic, derivatized cellulose, glycogen, starch, sugar alcohols, derivatized chitin, xanthan, pectins, guar, carob bean meal, carrageenan, superabsorbers, zeolites and combinations or mixtures thereof.

32. The microcapsules as claimed in claim 19, wherein the sheath comprises a polymer selected from the following group: polystyrene, polyacrylate, styrene-acrylate copolymer, polyurethane, polyvinyl alcohol, polyvinyl butyral, modified starch, modified cellulose, or copolymers, mixtures and/or crosslinked or crosslinkable forms thereof.

33. A security ink comprising as a pigment optically activatable bacteriorhodopsin-containing microcapsules as claimed in claim 19.

34. The security ink as claimed in claim 33, wherein the microcapsules are included in an aqueous slurry.

35. A powder comprising optically activatable bacteriorhodopsin-containing microcapsules as claimed in claim 19.

36. An aqueous slurry comprising optically activatable bacteriorhodopsin-containing microcapsules as claimed in claim 19.

37. The microcapsules as claimed in claim 19, wherein the bacteriorhodopsin/purple membrane patches are bacteriogenic.

* * * * *